(12) United States Patent
Kobayashi et al.

(10) Patent No.: US 7,036,034 B2
(45) Date of Patent: Apr. 25, 2006

(54) SYSTEM, METHOD AND COMPUTER PROGRAM PRODUCT FOR POWER-SAVING TASK PROCESSING

(75) Inventors: Yasuhito Kobayashi, Tokyo (JP); Masakazu Ishida, Tokyo (JP)

(73) Assignee: NEC Corporation, Tokyo (JP)

( * ) Notice: Subject to any disclaimer, the term of this patent is extended or adjusted under 35 U.S.C. 154(b) by 613 days.

(21) Appl. No.: 10/055,884

(22) Filed: Jan. 28, 2002

(65) Prior Publication Data

US 2002/0144167 A1   Oct. 3, 2002

(30) Foreign Application Priority Data

Jan. 29, 2001   (JP) .............................. 2001-020373

(51) Int. Cl.
   *G06F 1/26* (2006.01)

(52) U.S. Cl. ....................................... 713/340; 713/300
(58) Field of Classification Search ................ 713/300, 713/502, 100; 396/278; 714/24
   See application file for complete search history.

(56) References Cited

U.S. PATENT DOCUMENTS

| 5,557,365 | A | * | 9/1996 | Ohsawa ....................... 396/279 |
| 5,915,118 | A | * | 6/1999 | Migita ......................... 713/300 |
| 6,031,999 | A | * | 2/2000 | Ogawa ......................... 396/303 |
| 6,122,744 | A | * | 9/2000 | Rashkovskiy et al. ...... 713/300 |
| 6,289,399 | B1 | * | 9/2001 | Furuichi et al. ................ 710/6 |
| 6,343,191 | B1 | * | 1/2002 | Watanabe .................... 396/277 |
| 6,415,203 | B1 | * | 7/2002 | Inoue et al. ................. 700/245 |
| 6,480,761 | B1 | * | 11/2002 | Ueno et al. ................. 700/245 |
| 6,765,587 | B1 | * | 7/2004 | Zhang et al. ................ 345/606 |

\* cited by examiner

*Primary Examiner*—Thomas C. Lee
*Assistant Examiner*—Vincent Tran
(74) *Attorney, Agent, or Firm*—McGinn IP Law Group, PPLC (57) ABSTRACT

A system for power-saving task processing includes a remaining power detector detecting a remaining power of a battery, and a motion information table defining a relationship between the remaining power of the battery on execution of a task and a plurality of processes for each task. Each of the plurality of processes corresponds to a different remaining power of the battery. The system also includes a task controller that chooses and executes one of the plurality of processes from the motion information table according to the detection result of the remaining power detector.

22 Claims, 4 Drawing Sheets

FIG. 1
PRIOR ART

SYSTEM, METHOD AND COMPUTER PROGRAM PRODUCT FOR POWER-SAVING TASK PROCESSING

BACKGROUND OF THE INVENTION

1. Field of the Invention

The present invention relates to a technique for power-saving task processing. More particularly, the invention relates to a system, a method, and a computer program product for power-saving task processing that change dynamically the content or frequency of processor processes for a task. The invention is preferably applied to battery-powered apparatuses (e.g., robots).

2. Description of the Related Art

Conventionally, battery-powered robots are usually required to ensure complete execution of their tasks instructed. In other words, it is usual that the tasks of battery-powered robots are prohibited from terminating because of the lack or shortage of battery power before they are completed. In particular, with buttery-powered industrial robots, incomplete execution of task will cause serious malfunction. For example, incomplete execution of task leads directly to halt of manufacturing lines and/or generation of defective products.

As a result, conventionally, it is popular that the remaining battery power values required for completing specific tasks are stored in advance and then, the tasks are executed if the current battery power value is greater than the required power value and they are not executed if not.

Figure 1:
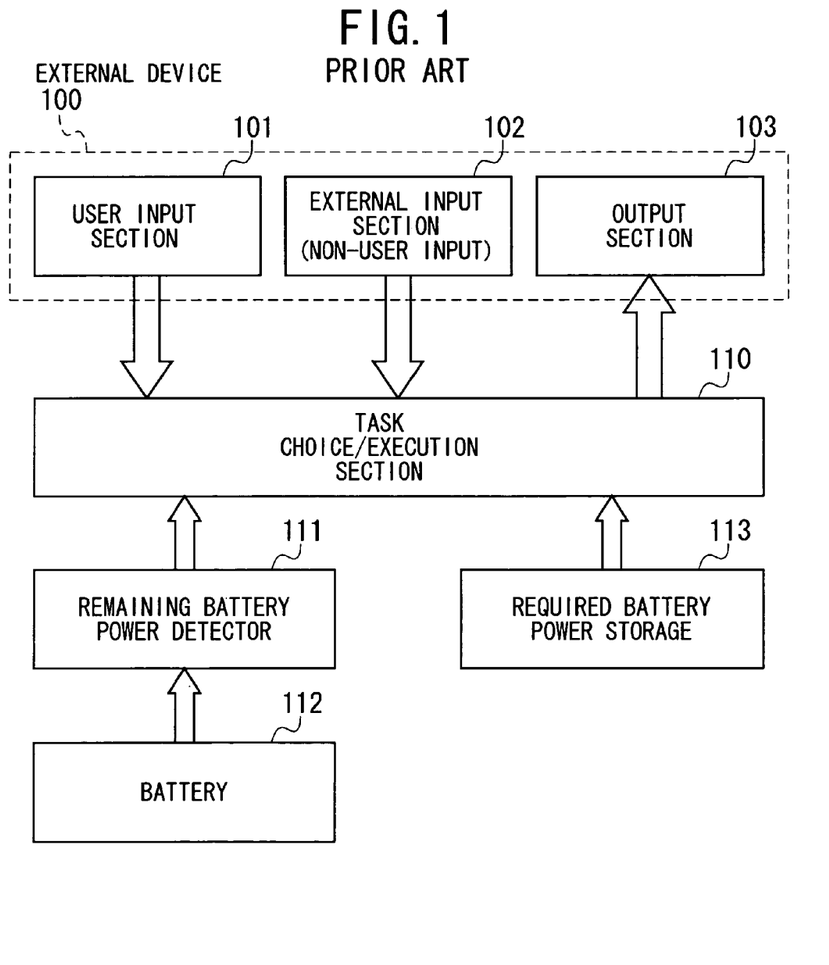
FIG. 1 is a schematic, functional block diagram showing the configuration of a prior-art, battery-powered robot.

FIG. 1 shows a prior-art battery-powered robot of this type. As shown in FIG. 1, the prior-art robot comprises an external device 100, a task choice/execution section 110, a remaining battery power detector 111, a battery 112, and a required battery power storage 113. The external device 100 includes a user input section 101, an external input (non-user input) section 102, and an output section 103.

The user input section 101 of the external device 100, which is formed by a remote controller, a keyboard, switch, or the like, receives a user input (i.e., instructions from the user) and transmits the same to the task choice/execution section 110.

The external input section 102 of the external device 100, which is formed by a sensor, a camera, a communication means, or the like, receives an external input (i.e., information about the circumstances of the robot or information from remote points (not shown in FIG. 1)) and transmits the same to the task choice/execution section 110.

The task choice/execution section 110 chooses a task to be executed from the information given by the user input section 101 or the external input section 102. The section 110 reads out the current power value from the remaining battery power detector 111 and the required battery power value for executing the task or tasks thus chosen from the required battery power storage 113. Then, the section 110 compares these two values thus read out and judges whether or not the task thus chosen is executable. If the task chosen is judged executable, the section 110 starts executing the task and transmits necessary instructions corresponding to the task to the output section 103.

The output section 103 outputs a specific action or motion of the robot according to the instruction from the section 110. The device 103 is, for example, formed by an image-displaying device, a sound-emitting device, a motor, an actuator, and/or relay.

The remaining battery power detector 111 monitors the state of charge of the battery 112. The detector 111 detects the remaining power of the battery 112 and then, sends the remaining power value to the section 110 as the answer to the inquiry made by the section 110.

The required battery power storage 113 stores the minimum values of battery power of the battery 112 required for executing specific tasks in the form of table. The storage 113 sends the require power value to the section 110 as the answer to the inquiry made by the section 110.

The following Table 1 shows an example of the table that includes two items, the "content of task" and the "required battery power for complete execution".

TABLE 1

| CONTENT OF TASK | REQUIRED BATTERY POWER FOR COMPLETE EXECUTION (%) |
|---|---|
| A | 30 |
| B | 20 |
| C | 10 |
| . | . |
| . | . |
| . | . |
| N | 25 |

As seen from Table 1, each of the tasks A, B, C, . . . , and N has its own required battery power that specifies the minimum value of battery power. If the task choice/execution section 110 makes an inquiry to the storage 113 while setting one of the tasks A, B, C, . . . , and N as a key, the storage 113 makes and sends an answer about the required battery power for the corresponding task to the section 110.

Next, the operation flow of the prior-art robot shown in FIG. 1 is explained below with reference to FIG. 2.

In the step S101, the information from the user input section 101 and/or the external input section 102 is transmitted to the task choice/execution section 110. In response this information, the section 10 chooses a specific task to be executed for performing a corresponding operation of the robot.

In the step S102, the section 110 makes an inquiry about the current battery power of the battery 112 to the required battery power detector 111. In response to this, the detector 111 makes an answer to the inquiry and sends it to the section 110.

In the step S103, the section 110 makes an inquiry about the required battery power for executing the task selected in the step S101 to the storage 113. Then, the storage 113 makes an answer to the inquiry and sends it to the section 110. Thus, the corresponding data to the task is extracted by the section 110.

In the step S104, the section 110 compares the current battery power from the detector 111 with the required battery power from the storage 113. If the current battery power is greater than the require battery power, i.e., if the answer in the step S104 is "YES", the section 110 judges the task chosen executable. Thereafter, the section 110 executes the task completely in the step S105 and the flow is finished. If the current battery power is not greater than the require battery power, i.e., if the answer in the step S104 is "NO", the section 110 judges the task chosen not executable. Thereafter, the section 110 does not execute the task, i.e., the step S105 is not performed, and the flow is finished.

In this way, with the prior-art robot of FIG. 1, the task chosen in the step S101 can be completely executed in the robot until the remaining power of the battery 112 reaches its limit.

Figure 2:
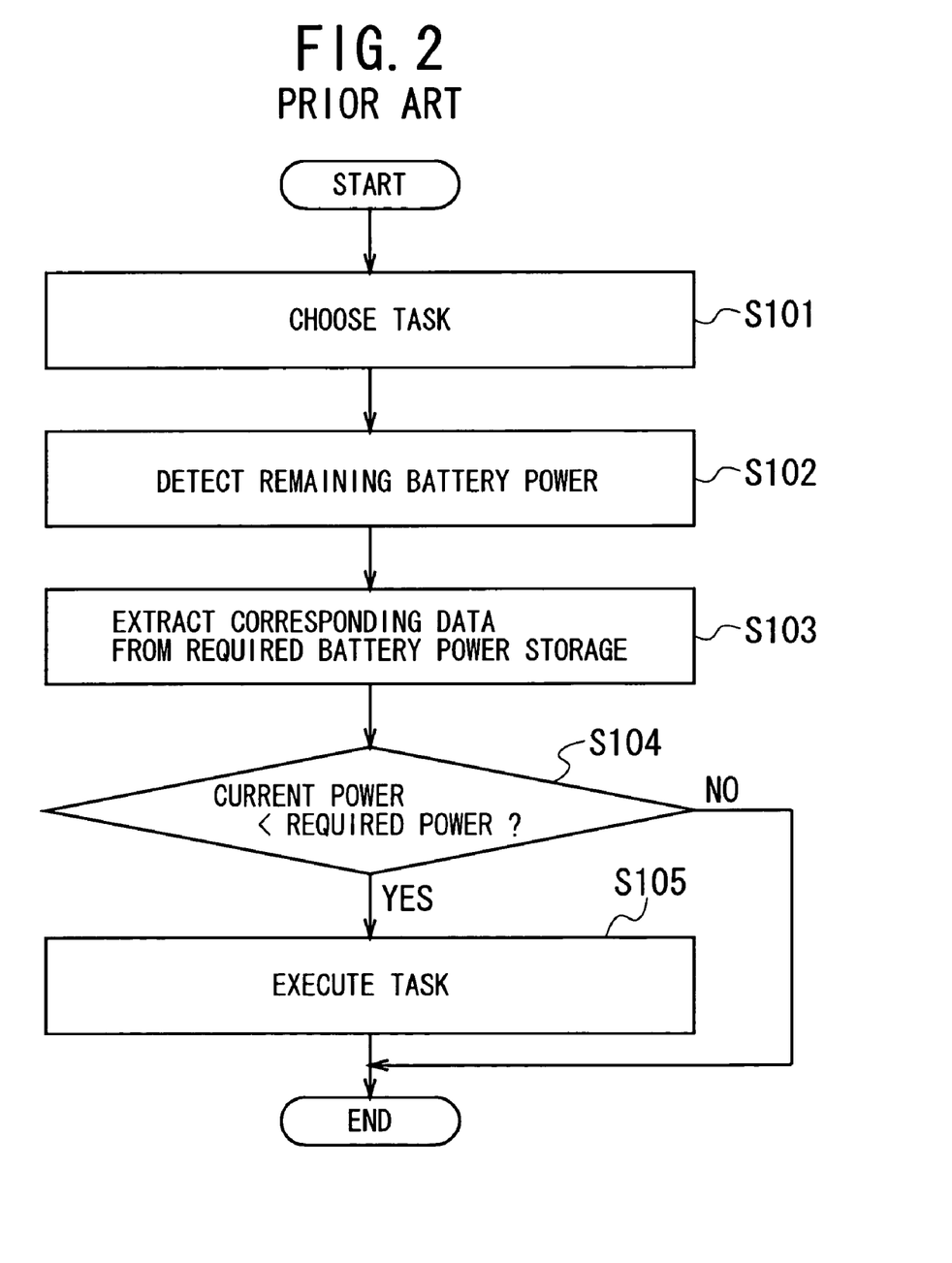
FIG. 2 is a flowchart showing the operation of the robot of FIG. 1.

With the prior-art robot shown in FIGS. 1 and 2, the content of the task to be executed is not changed according to the remaining power of the battery 112. There is no consideration that the content of the task is changed dependent of the magnitude or level of the remaining battery power.

The above-described prior-art robot has the following problems.

First, the task chosen in the step S101 needs to be always executed completely and correctly. Therefore, if the remaining battery power is lower than a specific limit value, execution of the tasks is suddenly stopped. In this case, the robot is not available or usable unless the battery 113 is sufficiently recharged.

Second, in contrast, if the remaining battery power is equal to or larger than the specific limit value, it is important that required or chosen tasks are executed correctly and completely as instructed. Therefore, the content of each task to be executed is always the same regardless of the remaining battery power. There is no consideration that the content of each task is changed to save the power of the battery 112 during execution of tasks.

SUMMARY OF THE INVENTION

Accordingly, an object of the present invention is to provide a system, a method, and a computer program product for power-saving task processing that avoid sudden stop of execution of tasks (i.e., sudden stop of execution of motions of a battery-powered apparatus) due to lack or insufficiency of battery power.

Another object of the present invention is to provide a system, a method, and a computer program product for power-saving task processing that make it possible for the user to feel continuous operation of a battery-powered apparatus (e.g., a robot) without inducing any feeling of wrongness in the user.

Still another object of the present invention is to provide a system, a method, and a computer program product for power-saving task processing that extend the actual usable or available period of time of a battery-powered apparatus through a single charging operation of the battery while keeping substantially the same result of execution of tasks.

A further object of the present invention is to provide a system, a method, and a computer program product for power-saving task processing that reduces the power consumption of a battery-powered apparatus while keeping substantially the same result of execution of tasks.

The above objects together with others not specifically mentioned will become clear to those skilled in the art from the following description.

According to a first aspect of the invention, a power-saving task processing system is provided. This system comprises:
(a) a remaining power detector for detecting remaining power of a battery;
the remaining power detector outputting a detection result about a value or state of the remaining power of the battery;
(b) a motion information storage for storing a motion information table;
the motion information table defining a relationship between values or states of the remaining power of the battery on execution of a task and processes for which complete execution is ensured at the respective values or states of the remaining power of the battery; and
(c) a task controller for controlling execution of tasks to be executed;
wherein when the task controller executes a tasks the task controller chooses and executes one of the processes from the motion information table according to the detection result of the remaining power detector.

With the power-saving task processing system according to the first aspect of the invention, the motion information table is stored in the motion information storage. The motion information table defines the relationship between the values or states of the remaining power of the battery on execution of a task and the processes for which complete execution is ensured at the respective values or states of the remaining power of the battery. When the task controller executes a task, it chooses and executes one of the processes from the motion information table according to the detection result about the value or state of the remaining power of the battery from the remaining power detector.

Thus, complete execution for the processes is ensured at the respective values or states of the remaining power of the battery and therefore, sudden stop of execution of tasks (i.e., sudden stop of execution of motions of a battery-powered apparatus) due to lack or insufficiency of battery power is avoided.

If each of the processes has a content to express the same meaning, the user can feel continuous operation of a battery-powered apparatus (e.g., a robot) without inducing any feeling of wrongness in the user.

Moreover, when the task controller executes a task, it changes the content or repetition frequency of process dynamically by choosing and executing one of the processes from the motion information table according to the current value or state of the remaining power of the battery. Accordingly, the actual usable or available period of time of a battery-powered apparatus through a single charging operation of the battery can be extended while keeping substantially the same result of execution of tasks. This means that the power consumption of a battery-powered apparatus is reduced while keeping substantially the same result of execution of tasks.

In a preferred embodiment of the system according to the first aspect of the invention, an additional motion information table is stored in the motion information storage. The additional motion information table defines a relationship between values or states of the remaining power of the battery on execution of a task and repetition frequency of a process for which complete execution is ensured at the respective values or states of the remaining power of the battery.

In another preferred embodiment of the system according to the first aspect of the invention, the motion information table includes a relationship between the values or states of the remaining power of the battery on execution of a task and repetition frequency of each of the processes at the respective values or states of the remaining power of the battery.

According to a second aspect of the invention, another power-saving task processing system is provided, which is the same as the system of the first aspect except that the motion information table defines a relationship between values or states of the remaining power of the battery on execution of a task and repetition frequency of a process for which complete execution is ensured at the respective values or states of the remaining power of the battery Specifically, this system comprises:
(a) a remaining power detector for detecting remaining power of a battery;
the remaining power detector outputting a detection result about a value or state of the remaining power of the battery;

(b) a motion information storage for storing a motion information table;

the motion information table defining a relationship between values or states of the remaining power of the battery on execution of a task and repetition frequency values of a task for which complete execution is ensured at the respective values or states of the remaining power of the battery; and (c) a task controller for controlling execution of tasks to be executed;

wherein when the task controller executes a task, the task controller chooses and executes one of the processes from the motion information table according to the detection result of the remaining power detector.

With the power-saving task processing system according to the second aspect of the invention, obviously, there are the same advantages as those of the power-saving task processing system according to the first aspect of the invention.

According to a third aspect of the invention, a power-saving task processing method is provided, which corresponds to the system of the first aspect of the invention. This method comprises the steps of:

(a) monitoring remaining power of a battery to output a monitoring result about a value or state of the remaining power of the battery;

(b) providing a motion information table;

the motion information table defining a relationship between values or states of the remaining power of the battery on execution of a task and processes for which complete execution is ensured at the respective values or states of the remaining power of the battery; and (c) controlling execution of tasks to be executed;

wherein when a task is executed, one of the processes is chosen and executed from the motion information table according to the monitoring result of the remaining power detector.

With the power-saving task processing method according to the third aspect of the invention, obviously, there are the same advantages as those of the power-saving task processing system according to the first aspect of the invention.

In a preferred embodiment of the method according to the third aspect of the invention, a relationship between values or states of the remaining power of the battery on execution of a task and repetition frequency of a process for which complete execution is ensured at the respective values or states of the remaining power of the battery is monitored in the step (a).

In another preferred embodiment of the method according to the third aspect of the invention, the motion information table includes a relationship between the values or states of the remaining power of the battery on execution of a task and repetition frequency of each of the processes at the respective values or states of the remaining power of the battery.

According to a fourth aspect of the invention, another power-saving task processing method is provided, which is the same as the method of the third aspect except that the motion information table defines a relationship between values or states of the remaining power of the battery on execution of a task and repetition frequency of a process for which complete execution is ensured at the respective values or states of the remaining power of the battery.

Specifically, this method comprises the steps of:

(a) monitoring remaining power of a battery to output a detection result about a value or state of the remaining power of the battery;

(b) providing a motion information table;

the motion information table defining a relationship between values or states of the remaining power of the battery on execution of a task and repetition frequency values of a task for which complete execution is ensured at the respective values or states of the remaining power of the battery; and (c) controlling execution of tasks to be executed;

wherein when a task is executed, one of the processes is chosen and executed from the motion information table according to the monitoring result of the remaining power detector.

With the power-saving task processing method to the fourth aspect of the invention, obviously, there are the same advantages as those of the power-saving task processing system according to the first aspect of the invention.

According to a fifth aspect of the invention, a computer program product for power-saving task processing is provided, which corresponds to the method of the third aspect of the invention. This program product has a computer readable medium and a computer program recorded thereon, which comprises:

(a) code that monitors remaining power of a battery to output a monitoring result about a value or state of the remaining power of the battery;

(b) code that provides a motion information table;

the motion information table defining a relationship between values or states of the remaining power of the battery on execution of a task and processes for which complete execution is ensured at the respective values or states of the remaining power of the battery; and (c) code that controls execution of tasks to be executed;

wherein when a task is executed, one of the processes is chosen and executed from the motion information table according to the monitoring result of the remaining power detector.

With the computer program product according to the fifth aspect of the invention, obviously, there are the same advantages as those of the power-saving task processing system according to the first aspect of the invention.

According to a sixth aspect of the invention, another computer program product for power-saving task processing is provided, which corresponds to the method of the fourth aspect of the invention. This program product has a computer readable medium and a computer program recorded thereon, which comprises:

(a) code that monitors remaining power of a battery to output a detection result about a value or state of the remaining power of the battery;

(b) code that provides a motion information table;

the motion information table defining a relationship between values or states of the remaining power of the battery on execution of a task and repetition frequency values of a task for which complete execution is ensured at the respective values or states of the remaining power of the battery; and (c) code that controls execution of tasks to be executed;

wherein when a task is executed, one of the processes is chosen and executed from the motion information table according to the monitoring result of the remaining power detector.

With the computer program product according to the sixth aspect of the invention, obviously, there are the same advantages as those of the power-saving task processing system according to the first aspect of the invention.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

Figure 3:
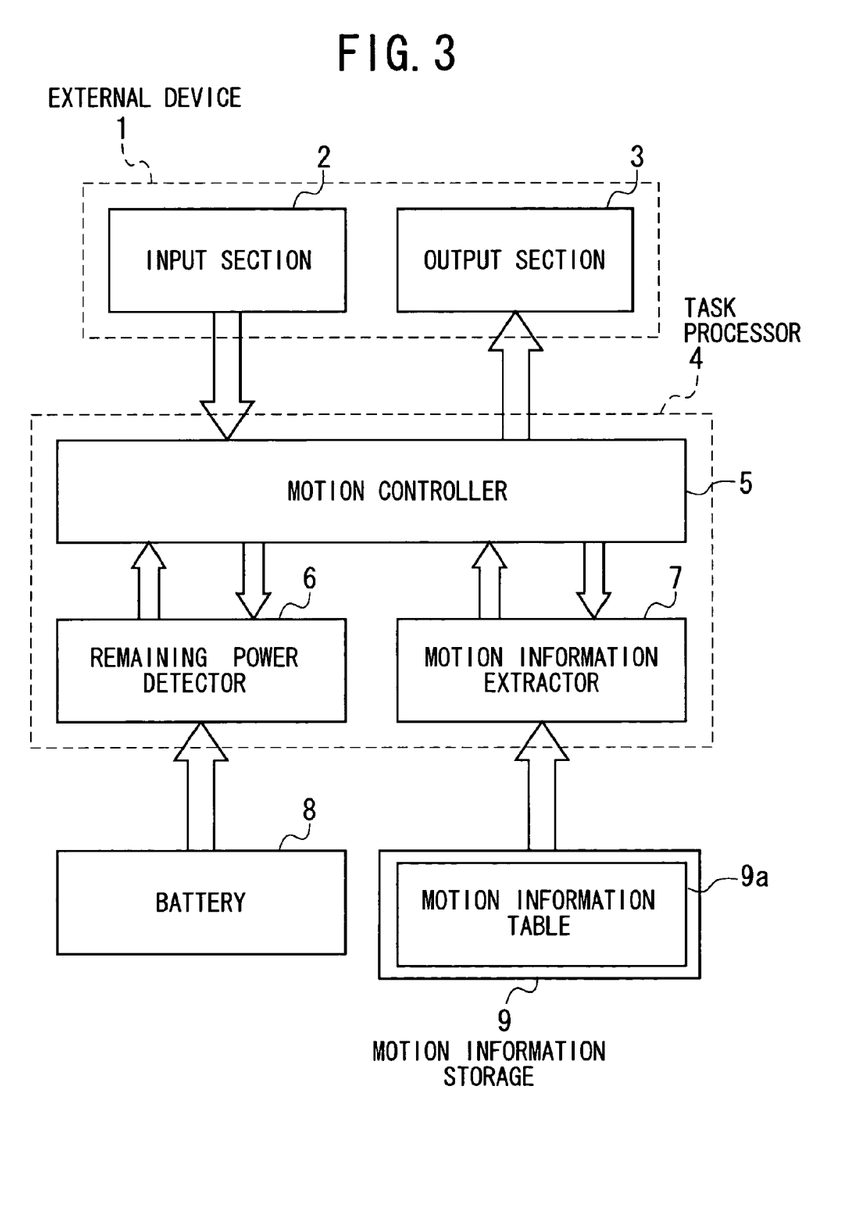
FIG. 3 is a schematic, functional block diagram showing the configuration of a battery-powered robot including a power-saving task processing system according to an embodiment of the invention.

A task processing system with power-saving function according to an embodiment of the invention has the configuration as shown in FIG. 3. In FIG. 3, the system is applied to a battery-powered, home/family-use robot.

As seen from FIG. 3, the task processing system of the embodiment comprises a task processor 4 and a motion information storage 9. The motion information storage 9 is used to store a motion information table 9a.

A battery 8, which is built in the robot, supplies electric power to the robot itself according to the necessity.

The task processor 4 includes an in-task motion controller 5, a remaining battery power detector 6, and an operation information extractor 7.

An external device 1, which includes an input section 2 and an output section 3, is built in the robot. The device 1 is used to perform specific robot motions.

The input section 2 of the external device 1 receives an external input to instruct execution of specific tasks to the motion controller 5 of the task processor 4.

The motion controller 5 makes an inquiry about the current state of the battery 8 to the remaining battery power detector 6. In response to this inquiry, the detector 6 detects the battery 8 and makes an answer about the current, remaining power of the battery 8 to the controller 5.

Moreover, to extract the motion information according to the power information about the remaining power of the battery 8 received from the detector 6, the motion controller 5 transmits or delivers the current, remaining power value of the battery 8 and the type of instructed robot motion to be performed to the motion information extractor 7 as a retrieval keyword. Thereafter, according to the motion information from the extractor 7, the controller 5 sends specific control information to the output section 3 of the external device 1. Thus, motion of respective devices provided in the section 3 is controlled.

In response to the inquiry about the current state of the battery 8 from the controller 5, the remaining power detector 6 detects the current, remaining power of the battery 8 to form a detection result and then, transmits the result to the controller 5.

The motion information extractor 7 searches the motion information table 9a stored in the storage 9 according to the keyword (i.e., the type of robot motion to be performed) sent from the controller 5, finding a piece of the information in the table 9a matched with the keyword. Thereafter, the extractor 7 extracts a piece of the information matched with the keyword and then, the extractor 7 transmits the search result to the controller 5.

In this embodiment, each of the tasks to be carried out by the task processor 4 corresponds to one of the motions of the robot with one-to-one correspondence. However, needless to say, each of the tasks to be carried out by the task processor 4 corresponds to some of the motions of the robot with one-to-many correspondence.

An example of the motion information table 9a is shown in Table 2 below, in which specific pieces of the motion information for the "rejection response" of the robot are listed corresponding to the respective states 1, 2, and 3 of the remaining battery power.

TABLE 2

| TYPE OF ROBOT MOTION | REMAINING BATTERY POWER | REPETITION FREQUENCY OF PROCESS (%) | DETAILED INFORMATION OF ROBOT MOTION |
| --- | --- | --- | --- |
| REJECTION RESPONSE | STATE 1 | 100 | Perform PROCESS A1 (Shaking the robot head three times right and left at 45° and answering in a voice) |
| | STATE 2 | 100 | Perform PROCESS A2 (Shaking the robot head once right and left at 45° and answering in a voice) |
| | STATE 3 | 100 | Perform PROCESS A3 (Answering in a voice without shaking the robot head) |

Table 2 contains four items, "Type of Robot Motion", "Remaining Battery Power", "Repetition Frequency of Process", and "Detailed Information of Robot Motion".

The item "Type of Robot Motion" represents the type of robot motions to be performed by the task, for example, "walking forward or backward", "responding rejection or agreement", "raising or falling a hand", and so on. These robot motions are caused by executing or performing the corresponding tasks in the task processor 4.

The item "Remaining Battery Power" represents the range or state of the remaining power of the battery 8. For example, the "Remaining Battery Power" is given by the range of less than 20%, from 20% to 50%, from 50% to 70%, or of greater than 70%, of the full-charged power. Alternately, the "Remaining Battery Power" may be given by the state "safe" or "danger".

The item "Repetition Frequency of Process" represents the repetition frequency of a process or processes for the robot motion chosen according to the instruction to be executed. For example, if the execution frequency is defined as 50%, it means that the process or processes is/are executed once if the corresponding instruction is given twice.

The item "Detailed Information of Robot Motion" represents the detail of the process or processes to be performed according to the robot motion instructed. For example, if the type of robot motion is "rejection response", the "Detailed Information of Robot Motion" describes how to perform the process or the combination of the processes to express the rejection response of the robot to the user.

As an example, Table 2 shows the rejection response, in which the detailed motion of the robot differs according to the remaining power state of the battery 8 while the repetition frequency thereof is the same as 100%. The item "Remaining Battery Power" contains three states 1, 2, and 3.

In the state 1, the content of robot motion is the Process A1 to shake the head of the robot three times right and left at 45° and to answer the rejection response in a voice (i.e., to emit specific words for answering the rejection response in a voice). In the state 2, the content of robot motion is the Process A2 to shake the head of the robot only once right and left at 45° and to answer the rejection response in a voice. In the state 3, the content of robot motion is the Process A3 to answer the rejection response in a voice without shaking the robot head.

In all the states 1, 2, and 3 shown in Table 2, the content of the robot motion (i.e., rejection response) is substantially the same, although the concrete robot motion is changed dynamically. Therefore, the user understands easily the content or meaning of the robot motion without inducing any feeling of wrongness in the user, regardless of whether the remaining power of the battery 8 is in the state 1, 2, or 3.

The levels or values BP1, BP2, and BP3 of the "Remaining Battery Power" in the states 1, 2, and 3 have the relationship of BP1>BP2>BP3. For example, if the power consumption of the lateral motion of the robot head right and left at 45° is defined as α(W) and the power consumption of the voice emission for rejection response is defined as β(W), the states 1, 2, 3 have the total power consumptions P1, P2, and P3 as follows:

$P1$(State 1)$=3\alpha+\beta(W)$ $P2$(State 2)$=\alpha+\beta(W)$ $P3$(State 3)$=\beta(W)$ Thus, as the remaining power of the battery 8 decreases, the total power consumption for executing the task of rejection response decreases. This leads to effective power consumption reduction of the robot.

With the previously-explained prior-art robot of FIGS. 1 and 2, the total power consumption for executing the task of rejection response is always kept at a specific value (e.g., P1) regardless of the remaining power of the battery 8 and thus, the total power consumption for executing the task of rejection response is kept the same. In this case, even if the remaining power of the battery 8 decreases, the total power consumption does not decrease.

The above explanation refers to the case where the content of the process (i e., Processes A1, A2, and A3) for the rejection operation differs corresponding to the state (i.e., States 1, 2, and 3) of the remaining battery power without changing the repetition frequency thereof. The following is another case of the invention, where the repetition frequency of the process differs corresponding to the state of the remaining battery power without changing the meaning thereof.

In this case, for example, the motion information is defined as shown in Table 3. As seen from Table 3, the repetition frequency is 100% for the state 1a, the repetition frequency is 60% for the state 2a, and the repetition frequency is 30% for the state 3a in the stand-by state where none of the user instructions is received in the processor 4. The same Process B to shake the robot head once right and left at 10° is performed in any of the states 1a, 2a, and 3a.

TABLE 3

| TYPE OF ROBOT MOTION | REMAINING BATTERY POWER | REPETITION FREQUENCY OF PROCESS (%) | DETAILED INFORMATION OF ROBOT MOTION |
|---|---|---|---|
| REJECTION RESPONSE | STATE 1a | 100 | Perform PROCESS B (Turning the robot head once right and left at 10°) |
| | STATE 2a | 60 | Perform PROCESS B (Turning the robot head once right and left at 10°) |
| | STATE 3a | 30 | Perform PROCESS B (Turning the robot head once right and left at 10°) |

Here, the repetition frequency of 100% means that the Process B is carried out ten times within five minutes. The repetition frequency of 60% or 30 t means that the Process B is carried out six or three times within five minutes, respectively.

The levels or values BP1a, BP2a, and BP a of the "remaining battery power" in the states 1a, 2a, and 3a have the relationship of BP1a>BP2a>BP3a. For example, if the power consumption of the lateral motion of the robot head right and left at 10° once is defined as γ (W) and the repetition frequency is defined as 10 within 5 minutes, the states 1a, 2a, 3a have the total power consumptions P1a, P2a, and P3a as follows:

$P1a$(State 1a)$=2.0\gamma(W/min)$ $P2a$(State 2a)$=1.2\gamma(W/min)$ $P3a$(State 3a)$=0.6\gamma(W/min)$ Thus, as the remaining power of the battery 8 decreases, the total power consumption for executing the task (Process B) of rejection response decreases.

If the total power consumption for executing the task of rejection response is always P1a regardless of the remaining power of the battery 8, the total power consumption for executing the task of rejection response is kept the same. Therefore, as the remaining power of the battery 8 decreases, the power consumption difference between the inventive embodiment and the prior-art robot of FIG. 1 becomes larger.

Furthermore, it is needless to say that the motion information sets of Tables 2 and 3 may be combined together in the invention. This is shown in Table 4 below.

TABLE 4

| TYPE OF ROBOT MOTION | REMAINING BATTERY POWER | REPETITION FREQUENCY OF PROCESS (%) | DETAILED INFORMATION OF ROBOT MOTION |
|---|---|---|---|
| REJECTION RESPONSE | STATE 1 | 100 | Perform PROCESS A1 (Shaking the robot head three times right and left at 45° and Answering in a voice) |
| | STATE 2 | 60 | Perform PROCESS A2 (Shaking the robot head once right and left at 45° and Answering in a voice) |
| | STATE 3 | 30 | Perform PROCESS A3 (Answering in a voice |

TABLE 4-continued

| TYPE OF ROBOT MOTION | REMAINING BATTERY POWER | REPETITION FREQUENCY OF PROCESS (%) | DETAILED INFORMATION OF ROBOT MOTION |
|---|---|---|---|
| | | | without shaking the robot head) |

Figure 4:
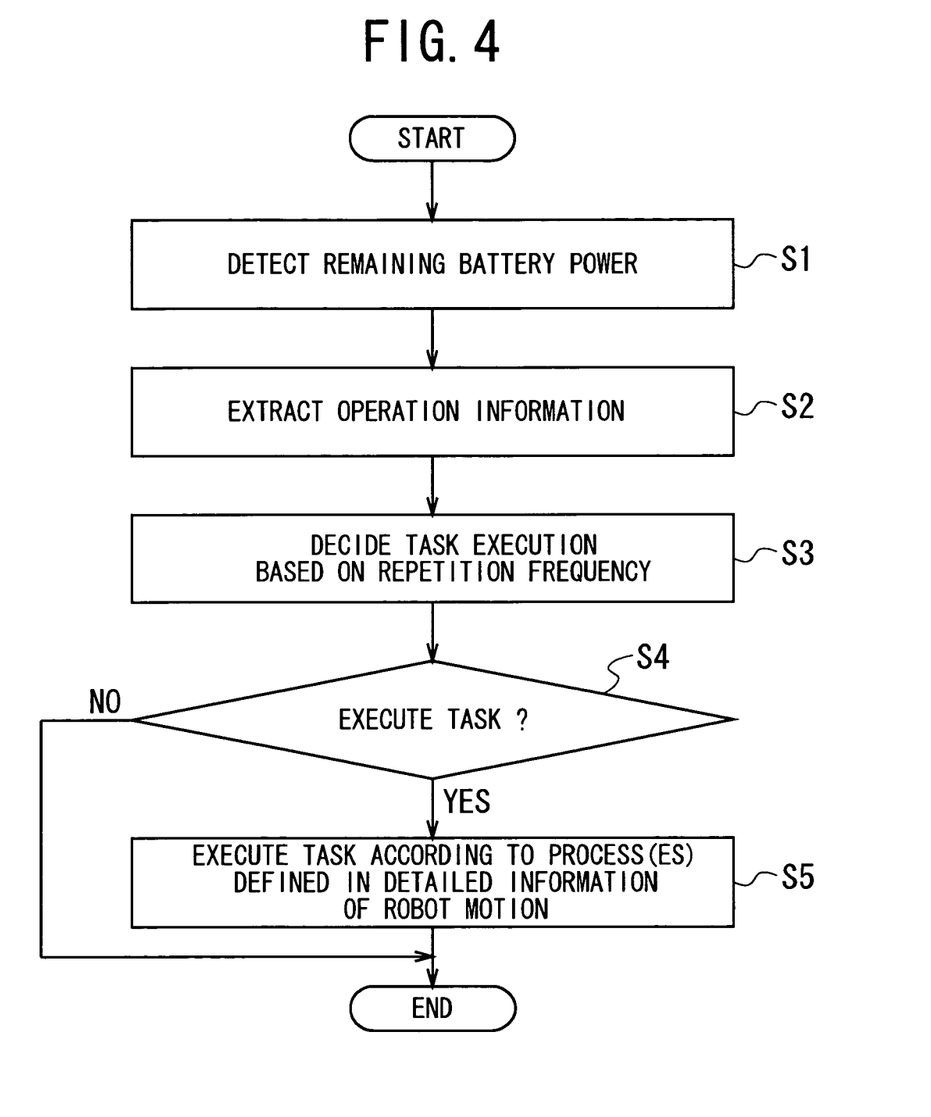
FIG. 4 is a flowchart showing the operation of the power-saving task processing system according to the embodiment of the invention of FIG. 3.

Next, the operation of the power-saving task processing system according to the embodiment of the invention is explained below with reference to FIG. 4.

Prior to execution of the task for a specific robot motion (e.g. the rejection response), one of the types of robot motion is chosen from the motion information table 9a. Thereafter, the steps S1 to S5 as shown in FIG. 4 are carried out successively.

In the step S1, the motion controller 5 makes an inquiry about the battery information (i.e., the current, remaining power of the battery 8) to the remaining power detector 6. In response to this, the detector 6 detects the current, remaining power of the battery 8 to make an answer to the inquiry. Then, the detector 6 sends the answer thus made to the controller 5.

In the step S2, the controller 5 sends the information about the current battery power sent from the detector 6 and the type of motion chosen prior to the step S1 to the motion information extractor 7. In response to this, the extractor extracts the piece of the motion information according to the type chosen. For example, if the motion type chosen is the "rejection response" and the "state 2" of the battery 8 is extracted, the extractor 7 extracts the set of the detailed information of the robot motion and the repetition frequency.

In the step S3, the controller 5 judges whether or not the motion of the type chosen should be performed based on the repetition frequency extracted. If the set of information to be referred is that listed in Table 2, the frequency is kept at 100%. Therefore, the motion is always executed. On the other hand, if the set of information to be referred is that listed in Table 3, the frequency is at 100%, 60%, or 30%. Therefore, the motion is performed or the motion is not performed according to the frequency used.

If the controller 5 makes a decision to perform the motion in the step S3, the judgment in the step S4 is "YES". Therefore, in the step S5, the robot motion is performed according to the motion information chosen. Thus, the controller 5 completes its task.

If the controller 5 makes a decision not to perform the motion in the step S3, the judgment in the step S4 is "NO". Therefore, in the step S5, the robot motion is not performed.

With the task processing system having the power saving function according to the embodiment of the invention, the invention is applied to the battery-powered, home/family-use robot that does not strictly require the completion of tasks. Thus, sudden stop of execution of tasks is avoided even when the remaining power of the battery 8 is equal to the specific level or lower, resulting in complete execution of tasks. Thus, the system can be designed in such a way that the user feels continuous operation of the robot as much as possible.

Moreover, several sets of the repetition frequency and the different processes A1 to A3 for a type of robot motion are prepared and stored in the storage 9. One of the sets thus prepared is selectively used dependent on the remaining power of the battery 8. As a result, the actual usable or available period of time of the robot through a single charging operation of the battery 8 can be extended while keeping substantially the same result of the task. In other words, the power consumption of the battery-powered robot can be reduced while keeping substantially the same result of execution of tasks.

In the above-described embodiment, for the sake of facilitating the explanation, the operation information table 9a as shown in Table 1 or 2 includes only one type of robot motion. However, it is needless to say that the table 9a actually includes a plurality of types of robot motion.

Variations

Needless to say, the present invention is not limited to the above-described embodiment. Any change or modification may be added to the embodiment within the spirit of the invention.

For example, the invention is applied to a battery-powered, home/family-use robot in the embodiment. However, the invention is not limited to this. The invention may be applied to any battery-powered robot that does not strictly require the completion and certainty of tasks for robot operations. Moreover, the invention is applicable to any other battery-powered apparatus or machine if it is of the same type as the battery-powered, home/family-use robot.

While the preferred form of the present invention has been described, it is to be understood that modifications will be apparent to those skilled in the art without departing from the spirit of the invention. The scope of the present invention, therefore, is to be determined solely by the following claims.

What is claimed is:

1. A power-saving task processing system comprising:
   a remaining power detector for detecting a remaining power of a battery; the remaining power detector outputting a detection result about a value or state of the remaining power of the battery;
   a motion information-storage for storing a motion information table; the motion information table defining a relationship between values or states of the remaining power of the battery on execution of a task and a plurality of processes for said task, each of the plurality of processes corresponding to a different value or state of the remaining power of the battery and for which complete execution is ensured at the respective values or states of the remaining power of the battery; and
   a task controller for controlling execution of tasks to be executed; wherein when the task controller executes a task, the task controller chooses and executes one of the plurality of processes from the motion information table according to the detection result of the remaining power detector, wherein said motion information table further comprises a repetition frequency for each of the plurality of processes.

2. The system according to claim 1,
   wherein an additional motion information table is stored in the motion information storage; and
   wherein the additional motion information table defines a relationship between values or states of the remaining power of the battery on execution of a task and a repetition frequency of each of the plurality of processes for which complete execution is ensured at the respective values or states of the remaining power of the battery.

3. The system according to claim 1, wherein the motion information table includes a relationship between the values or states of the remaining power of the battery on execution of a task and a repetition frequency of each of the plurality of processes at the respective values or states of the remaining power of the battery.

4. A power-saving task processing system comprising:
   a remaining power detector for detecting a remaining power of a battery; the remaining power detector outputting a detection result about a value or state of the remaining power of the battery;
   a motion information storage for storing a motion information table; the motion information table defining a relationship between values or states of the remaining power of the battery on execution of a task and repetition frequency values for each of a plurality of processes for the task for which complete execution of a corresponding one of the plurality of processes is ensured at the respective values or states of the remaining power of the battery; and
   a task controller for controlling execution of tasks to be executed; wherein when the task controller executes a task, the task controller chooses and executes one of the plurality of processes from the motion information table according to the detection result of the remaining power detector.

5. A power-saving task processing method comprising:
   monitoring a remaining power of a battery to output a monitoring result about a value or state of the remaining power of the battery;
   providing a motion information table; the motion information table defining a relationship between values or states of the remaining power of the battery on execution of a task and a plurality of processes for the task, each of the plurality of processes corresponding to a different value or state of the remaining power of the battery and for which complete execution is ensured at the respective values or states of the remaining power of the battery; and
   controlling execution of tasks to be executed; wherein, when a task is executed, one of the plurality of processes is chosen and executed from the motion information table according to the monitoring result of the remaining power detector, wherein said motion information table further comprises a repetition frequency for each of the plurality of processes.

6. The method according to claim 5, wherein monitoring the remaining battery power further comprises monitoring a relationship between values or states of the remaining power of the battery on execution of a task and a repetition frequency of at least one of the plurality of processes for which complete execution is ensured at the respective values or states of the remaining power of the battery.

7. The method according to claim 5, wherein the motion information table includes a relationship between the values or states of the remaining power of the battery on execution of a task and a repetition frequency of each of the plurality of processes at the respective values or states of the remaining power of the battery.

8. A power-saving task processing method comprising:
   monitoring a remaining power of a battery to output a detection result about a value or state of the remaining power of the battery;
   providing a motion information table; the motion information table defining a relationship between values or states of the remaining power of the battery on execution of a task and a repetition frequency values for each of a plurality of processes of a task for which complete execution is ensured at the respective values or states of the remaining power of the battery; and
   controlling execution of tasks to be executed; wherein when a task is executed, one of the plurality of processes is chosen and executed from the motion information table according to the monitoring result of the remaining power detector.

9. A computer program product having a computer readable medium and a computer program recorded thereon; the computer program being operable for power-saving task processing, the product comprising:
   code that monitors a remaining power of a battery to output a monitoring result about a value or state of the remaining power of the battery;
   code that provides a motion information table; the motion information table defining a relationship between values or states of the remaining power of the battery on execution of a task and a plurality of processes for each task, each of the plurality of processes corresponding to a different value or state of the remaining batter power and for which complete execution is ensured at the respective values or states of the remaining power of the battery; and
   code that controls execution of tasks to be executed; wherein when a task is executed, one of the plurality of processes is chosen and executed from the motion information table according to the monitoring result of the remaining power detector, wherein said motion information table further comprises a repetition frequency for each of the plurality of processes.

10. The product according to claim 9, wherein the code that monitors a remaining battery power comprises a code that monitors a relationship between values or states of the remaining power of the battery on execution of a task and a repetition frequency of a process for which complete execution is ensured at the respective values or states of the remaining power of the battery.

11. The product according to claim 9, wherein the motion information table includes a relationship between the values or states of the remaining power of the battery on execution of a task and a repetition frequency of each of the plurality of processes at the respective values or states of the remaining power of the battery.

12. A computer program product having a computer readable medium and a computer program recorded thereon; the computer program being operable for power-saving task processing, the product comprising:
   code that monitors a remaining power of a battery to output a detection result about a value or state of the remaining power of the battery;
   code that provides a motion information table; the motion information table defining a relationship between values or states of the remaining power of the battery on execution of a task and a repetition frequency values of each of a plurality of processes of a task for which complete execution is ensured at the respective values or states of the remaining power of the battery; and
   code that controls execution of tasks to be executed; wherein when a task is executed, one of the plurality of processes is chosen and executed from the motion information table according to the monitoring result of the remaining power detector.

13. The system of claim 1, wherein a content of each of the plurality of processes differs according to the detected remaining power.

14. The system of claim 1, wherein each of the plurality of processes progressively define alternate content requiring less power consumption for completing said task.

15. The system of claim 1, wherein an amount of content of each of the plurality of processes corresponds to the amount of detected remaining power.

16. The system of claim 1, wherein the repetition frequency determines a number of times that a corresponding one of the plurality of processes is executed in a predetermined amount of time.

17. The system of claim 1, wherein the repetition frequency determines a number of times that a corresponding one of the plurality of processes is executed each time a corresponding task is instructed.

18. A power-saving task processor comprising:
- a remaining power detector that detects a remaining power of a battery and outputs a detection result based upon the detected remaining power of the battery;
- a motion information table comprising a plurality of processes for a task, each of the plurality of processes corresponding to a different remaining power of the battery; and
- a task controller that selects between one of the plurality of processes for the task based upon the detected remaining power of the battery, wherein said motion information table further comprises a repetition frequency for each of the plurality of processes.

19. The processor of claim 18, wherein the content of each of the plurality of processes differs according to the detected remaining power.

20. The processor of claim 19, wherein the amount of content of each of the plurality of processes corresponds to the amount of detected remaining power.

21. The processor of claim 18, wherein the repetition frequency determines the number of times that a corresponding one of the plurality of processes is executed in a predetermined amount of time.

22. The processor of claim 18, wherein the repetition frequency determines the number of times that a corresponding one of the plurality of processes is executed each time the corresponding task is instructed.

* * * * *